United States Patent
Hyte

(10) Patent No.: US 8,752,439 B2
(45) Date of Patent: Jun. 17, 2014

(54) DYNAMIC TORQUE SENSING SYSTEM

(76) Inventor: Jeffrey Alan Hyte, Midvale, UT (US)

( * ) Notice: Subject to any disclaimer, the term of this patent is extended or adjusted under 35 U.S.C. 154(b) by 143 days.

(21) Appl. No.: 13/556,427

(22) Filed: Jul. 24, 2012

(65) Prior Publication Data

US 2014/0026680 A1    Jan. 30, 2014

(51) Int. Cl.
  *G01L 3/02*    (2006.01)
(52) U.S. Cl.
  USPC .................................. 73/862.191; 73/862.08
(58) Field of Classification Search
  USPC ............... 73/862.06, 862.08, 862.09, 862.12, 73/862.191
  See application file for complete search history.

(56) References Cited

U.S. PATENT DOCUMENTS

| | | | | |
|---|---|---|---|---|
| 3,765,234 A | * | 10/1973 | Sievert | 73/862.191 |
| 4,154,097 A | * | 5/1979 | Scott | 73/862.09 |
| 4,428,249 A | * | 1/1984 | Henk | 74/412 TA |
| 4,979,397 A | * | 12/1990 | Kronberg | 73/862.191 |
| 5,205,163 A | * | 4/1993 | Sananikone | 73/152.48 |
| 5,456,640 A | * | 10/1995 | Petersen | 475/330 |
| 6,070,506 A | * | 6/2000 | Becker | 81/479 |
| 6,182,516 B1 | * | 2/2001 | Kowalczyk | 73/862.12 |
| 6,360,156 B1 | * | 3/2002 | Morganroth et al. | 701/69 |
| 7,124,648 B2 | * | 10/2006 | Shibazaki et al. | 73/862.08 |
| 7,267,015 B2 | * | 9/2007 | Stamm et al. | 73/862.08 |
| 7,406,887 B2 | * | 8/2008 | Jensen | 74/41 |

* cited by examiner

*Primary Examiner* — Max Noori

(57) ABSTRACT

A torque sensing system can sense the torque that is flowing through a mechanical system. The torque sensing system allows for better control because the torque and horsepower of the mechanical system can be known at all times. The torque sensing system includes an input shaft and an output shaft that prompts a torque shaft to deflect onto a load cell, where the force of the deflection of the torque shaft onto the load cell may be used to determine the torque of the system.

10 Claims, 3 Drawing Sheets

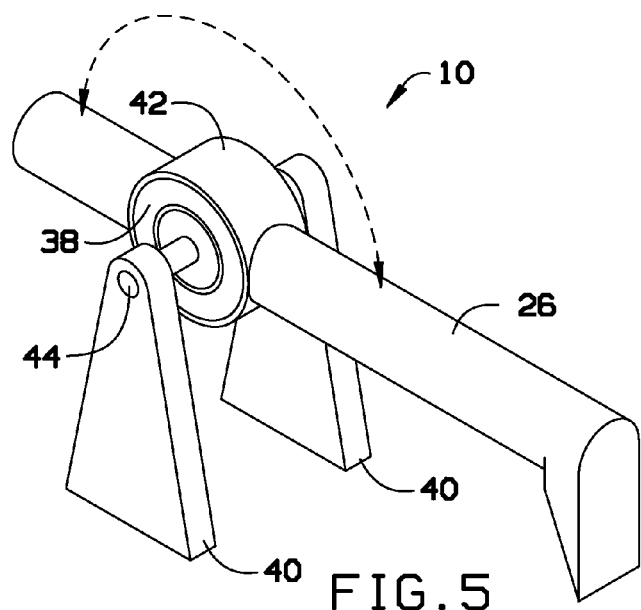
FIG. 5
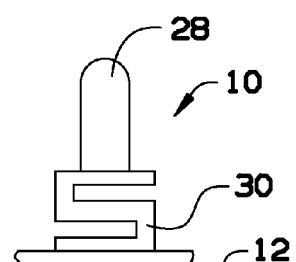
FIG. 6
FIG. 7
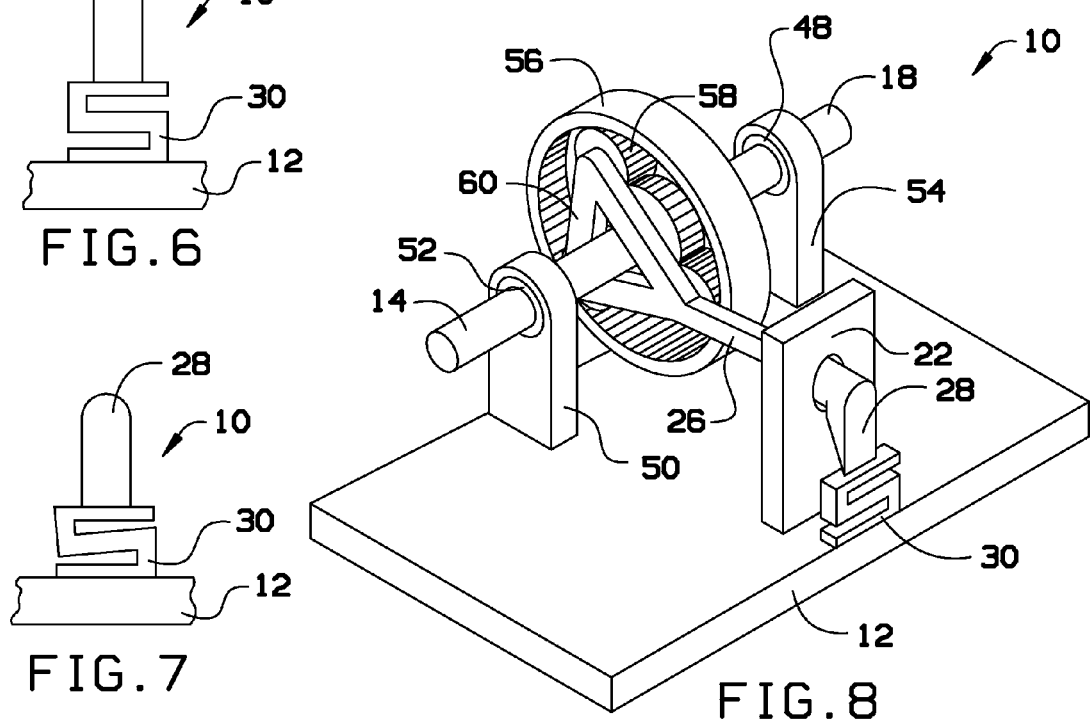
FIG. 8

DYNAMIC TORQUE SENSING SYSTEM

BACKGROUND OF THE INVENTION

The present invention relates to apparatus for measuring torque and, more particularly, to a dynamic torque sensing system, adapted to be integrated into another mechanical system with a rotating shaft or axle, which will sense the torque in the system.

Existing today are many mechanical systems that do not have the ability to monitor the torque at given locations within the mechanical system.

Knowing the torque of a mechanical system would be helpful for many reasons, one of which being permitting the Horsepower of the system to be known.

Current torque sensing devices do not provide a direct relation to torque. These devices rely on the use of strain gauges applied to the surface of a rotating shaft or axle. This, of course, requires the use of slip rings, wireless telemetry, or rotary transformers. The strain that is finally measured represents the forces acting on the surface of the shaft or axle.

As can be seen, there is a need for a device for sensing the torque in a mechanical system.

SUMMARY OF THE INVENTION

In one aspect of the present invention, a torque sensor comprises an input shaft adapted to receive rotational force from a mechanical system; an input shaft gear attached to the input shaft; an output shaft; an output shaft gear attached to the output shaft; a torque gear adapted to be turned by the input shaft gear, the torque gear adapted to turn the output shaft gear; a pivot joint; a torque shaft pivotally attached to the pivot joint; a first end of the torque shaft connected to the torque gear through a torque gear bearing; and a second end of the torque shaft positioned to apply pressure to a load cell, wherein torque in the mechanical system causes the torque gear and, consequently, the torque shaft, to pivot about the pivot joint, causing the second end of the torque shaft to apply pressure to the load cell in proportion to the torque in the mechanical system.

In another aspect of the present invention, a torque sensor comprises an input shaft adapted to receive rotational force from a mechanical system; an output shaft adapted to rotate with rotation of the input shaft; a torque shaft connected to the input shaft via one or more gears; an upper/lower torque bar limiter for limiting an amount of motion of the torque shaft; and a load cell adapted to measure force applied thereto by the torque shaft, wherein rotation of the input shaft causes the torque shaft to pivot and apply a force against the load cell relative to the torque in the mechanical system.

In a further aspect of the present invention, a torque sensor comprises an input shaft adapted to receive rotational force from a mechanical system; an input shaft bevel gear attached to the input shaft; an output shaft; an output shaft bevel gear attached to the output shaft; a first torque bevel gear adapted to be turned by the input shaft gear, the torque gear adapted to turn the output shaft gear; a pivot joint; a torque shaft pivotally attached to the pivot joint; a first end of the torque shaft connected to the torque gear through a torque gear bearing; a second end of the torque shaft positioned to apply pressure to a load cell; a second torque gear, the second torque gear positioned opposite the torque gear, wherein the torque shaft passes through the second torque gear through a second torque gear bearing; and an upper/lower torque bar limiter adapted to limit a degree of pivot of the torque shaft, wherein torque in the mechanical system causes the torque gear and, consequently, the torque shaft, to pivot about the pivot joint, causing the second end of the torque shaft to apply pressure to the load cell in proportion to the torque in the mechanical system.

These and other features, aspects and advantages of the present invention will become better understood with reference to the following drawings, description and claims.

BRIEF DESCRIPTION OF THE DRAWINGS

FIG. 5 is a perspective view of the torque sensor of FIG. 1 illustrated with multiple components omitted for clarity;

FIG. 6 is a front detail view of the torque sensor of FIG. 1 illustrated with multiple components omitted for clarity and demonstrating a neutral configuration of a load cell;

FIG. 7 is a front detail view of the torque sensor of FIG. 1 illustrated with multiple components omitted for clarity and demonstrating a compressed configuration of the load cell;

FIG. 8 is a perspective view of a torque sensor according to an alternate embodiment of the present invention.

DETAILED DESCRIPTION OF THE INVENTION

Figure 1:
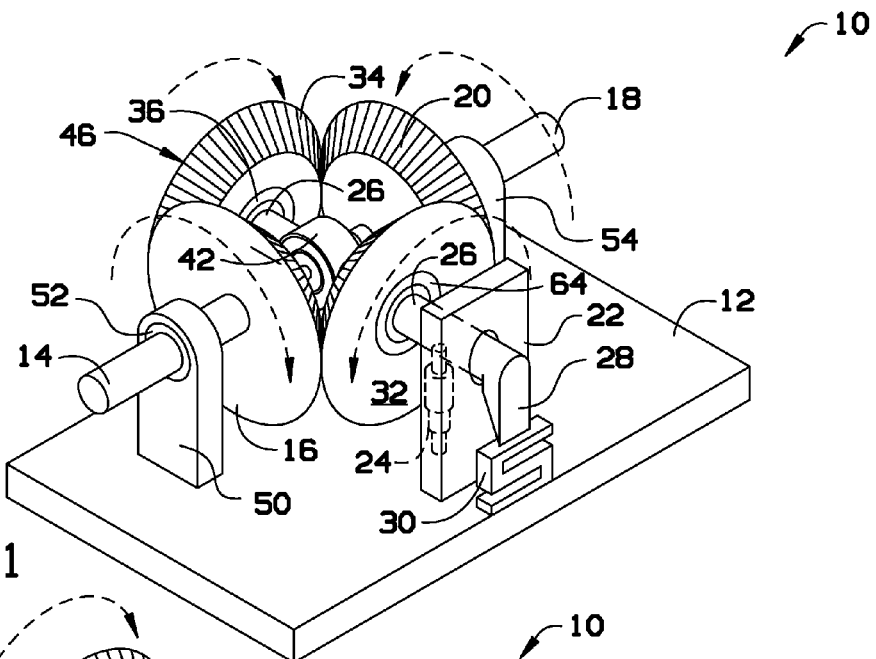
FIG. 1 is a perspective view of a torque sensor according to an exemplary embodiment of the present invention.
Figure 2:
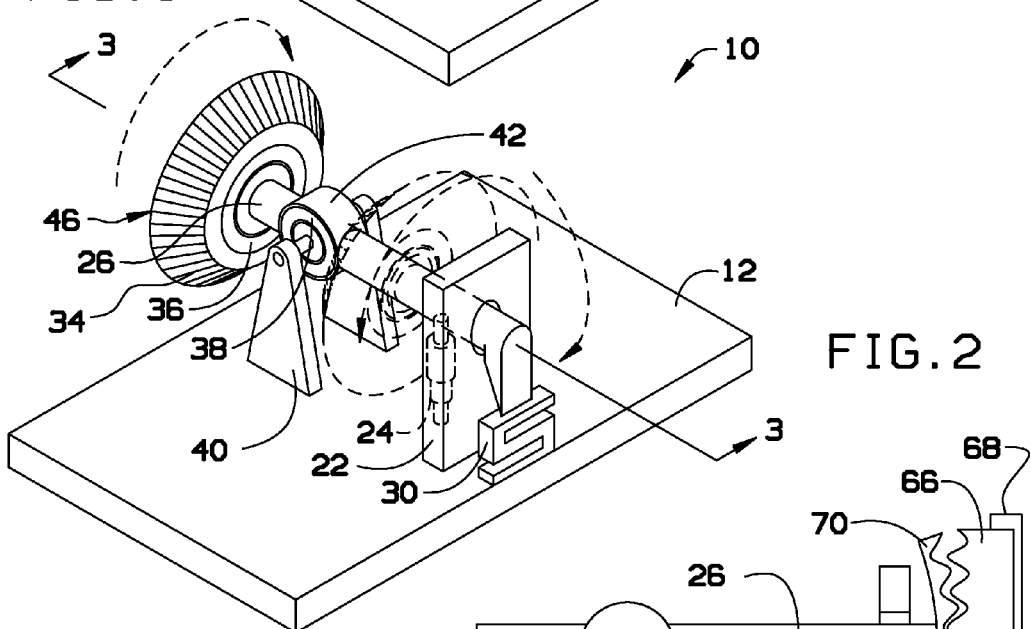
FIG. 2 is a perspective view of the torque sensor of FIG. 1 illustrated with multiple components omitted for clarity.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a torque sensing system that can sense the torque that is flowing through a mechanical system. The torque sensing system allows for better control because the torque and horsepower of the mechanical system can be known at all times. The torque sensing system includes an input shaft and an output shaft that prompts a torque shaft to deflect onto a load cell, where the force of the deflection of the torque shaft onto the load cell may be used to determine the torque of the system.

Referring to FIGS. 1 through 7, a torque sensor 10 may be mounted on a base 12 and may include an input shaft 14 adapted to receive mechanical energy from a mechanical system (not shown). The input shaft 14 may be mounted on an input shaft support 50. An input shaft bearing 52 may permit rotation of the input shaft 14 within the input shaft support 50. The input shaft 14 may cause an input bevel gear 16 to rotate. The rotation of input bevel gear 16 may cause a damper side torque gear 32 and a far side torque gear 34 to rotate. These gears 32, 34 may cause an output bevel gear 20 to rotate. An output shaft 18 may be connected to the output bevel gear 20 to turn along with the rotation of the output bevel gear 20. The output shaft 18 may be mounted on an output shaft support 54. An output shaft bearing 48 may permit rotation of the output shaft 18 within the output shaft support 54.

Figure 3:
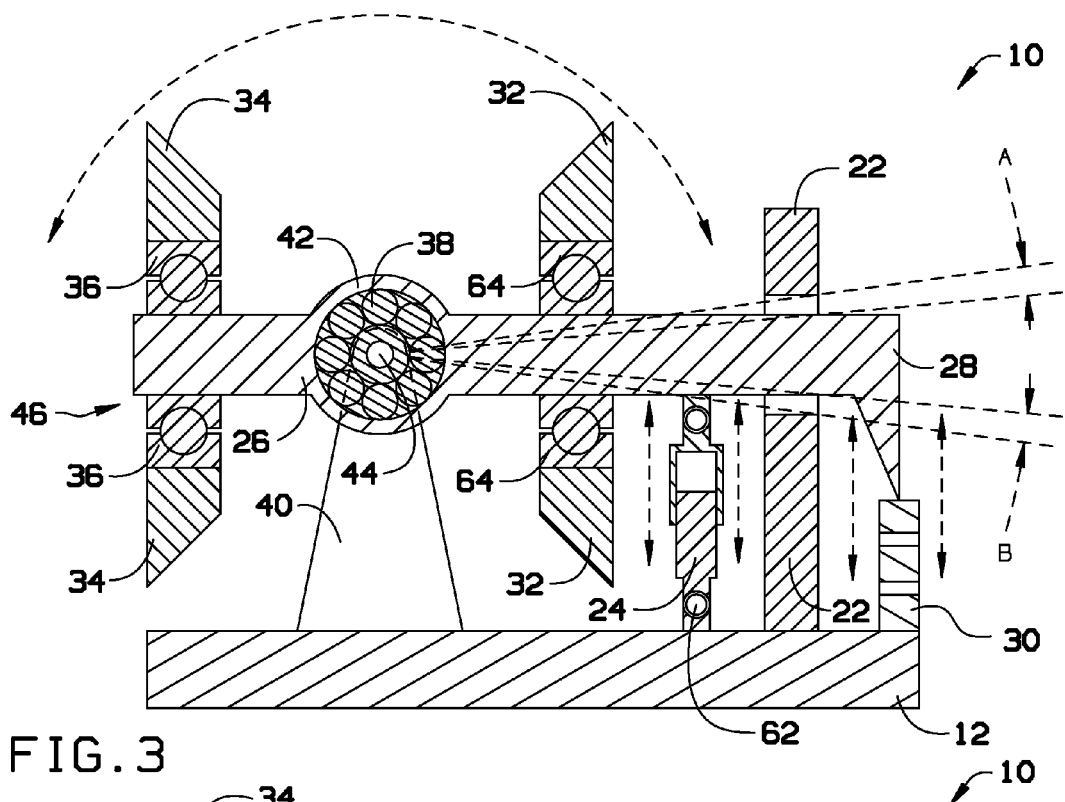
FIG. 3 is a sectional view taken along line 3-3 of FIG. 2 illustrated in a neutral position, with multiple components omitted for clarity and showing range of motion of a rocking arm assembly of the torque sensor.

A torque shaft 26 may be mounted from a pivot joint shaft 44 supported by a pivot joint support 40. A pivot bearing 38 may be supported by the pivot joint shaft 44. A pivot joint shaft 44 may be supported by the pivot joint support 40. A pivot joint shell 42 may encase the pivot bearing 38. The torque shaft 26 may pivot about the pivot bearing 38 as shown in FIG. 3. An upper/lower torque bar limiter 22 may limit the amount of pivot of the torque shaft 26 to an upper distance A and a lower distance B. At one end, the torque shaft 26 may connect to the gear 34 via a far side torque bearing 36. Torque shaft 26 may also connect to gear 32 via a far side torque bearing 64. On the other end, the torque shaft 26 may include a torque shaft arm 28 adapted to press against a load cell 30 (electrical connections of load cell not shown). A damper 24 may be disposed to prevent shock to the load cell 30. The damper 24 may be any damping means as may be known in the art. The damper 24 may include pivot joints 62 to change the angle of the damper 24 as the angle of the torque shaft 26 changes.

Figure 4:
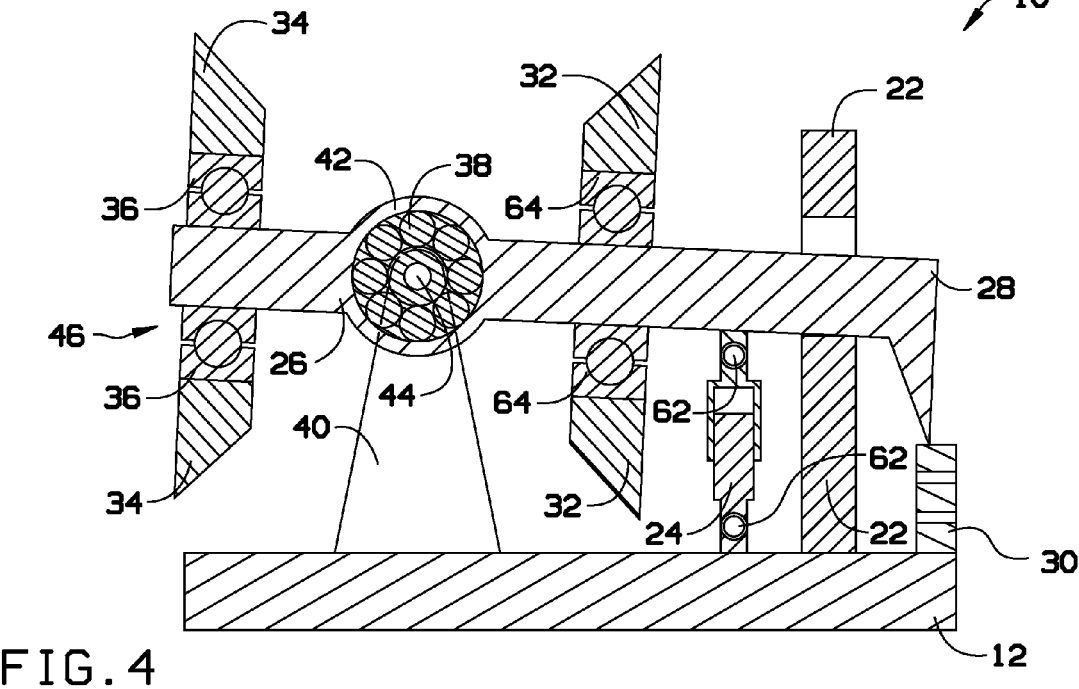
FIG. 4 is a sectional view taken along line 3-3 of FIG. 2 illustrated in a clockwise-rotated position with multiple components omitted for clarity and showing range of motion of the rocker arm assembly of the torque sensor.

In use, rotation of the input bevel gear 16 may cause the gear 34 to rotate and tilt, as shown in FIG. 4. As the gear 34 tilts, the torque shaft 26 may tilt and the torque shaft arm 28 may apply a force against the load cell 30. The force that is registered at the load cell 30 may be multiplied by the lever arm of the torque shaft 26 to obtain a torque value. As the torque of the mechanical system becomes less, the tilt of the torque shaft 26 becomes less, and the force on the load cell 30 may become less.

While the above description describes the torque sensor 10 as having a damper side torque gear 32 and a far side torque gear 34, the torque sensor 10 may operate with only one of the gears 32 or 34. For example, the torque sensor 10 may include only the far side torque gear 34. The torque sensor 10 may also operate with 3 or more of these gears.

Referring now to FIG. 8, in an alternate embodiment of the present invention, the input shaft 14 may connect, through a plurality of support gears 58, to a main gear 56. A gear bracket 60 may be connected to the support gears 58 in such a manner that, as the input shaft 14 is turned, the torque shaft arm 28 may be deflected towards the load cell 30 to provide a means of measuring the torque of a mechanical system (not shown).

Figure 9:
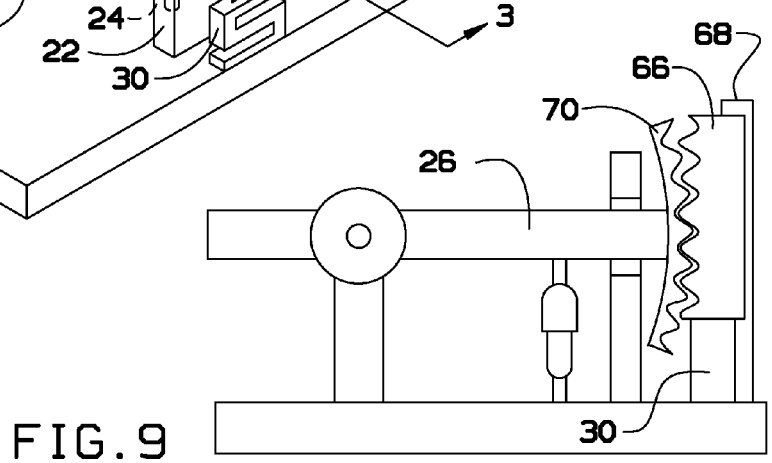
FIG. 9 is a close-up side view of a torque sensor according to an alternate embodiment of the present invention.

It is noted that initially with no torque in the system the force vector from the torque shaft arm 28 to the load cell 30 is vertical. As the system approaches its maximum torque limit the torque shaft arm 28 will depress the load cell 30 to approach its maximum compression limit. At this point the force vector from the torque shaft arm 28 is no longer 100% vertical, in fact it will have a horizontal force vector component and a vertical force vector component. A vertical load cell 30 will only capture the vertical force vector component. This can be addressed several different ways. FIG. 9, below, describes one such was to address this point.

Referring now to FIG. 9, in an alternate embodiment of the present invention, the torque shaft arm 28 of FIGS. 1 through 4 may be replaced with a gear 70. The gear 70 may mesh with a gear 66 disposed on a linear bearing track 68. The motion of the gear 66 along the track 68 is positioned to press against load cell 30 to provide an indication of the torque of the system. With the linear track design, a purely linear motion is measured and, therefore, no corrections need to be calculated based on angles.

While the system of FIG. 9 shows one way to address the issue of an angled force vector, other means may be used to achieve the same result. For example, a device can be attached to detect the angle or "tilt" of the torque shaft 26. This angle can be used with the vertical force vector component to calculate the torque in the system. Alternatively, the numerical values of the vertical force vector component can be related to a known set of torque values to estimate the torque in the system. As a further alternative, two load cells can be used. One load cell could be installed in a horizontal direction to capture the horizontal force vector component. The second load cell could be installed in a vertical direction to capture the vertical force vector component. The two components can then be added to each other to obtain the force vector that can be used to calculate the torque in the system.

In any mechanical system that transmits rotational mechanical energy through it, it will have many areas that torque will be present, shafts, gears, axles, frames, and the like. For example, in the present invention, torque exists about the axis of the input shaft 14, the input bevel gear 16, the output bevel gear 20, and the output shaft 18. The problem has always been how to measure this dynamic torque. With the particular setup described above, the axis of the pivot bearing 38 also has the system torque about it. This is very easily detectable because the torque shaft 26 is not used to transmit rotational mechanical energy. It is used solely for the purpose of producing a force on the load cell. It can be explained this way, the rotational mechanical energy from the input bevel gear 16 is split two ways to the output bevel gear 20. The first way is through the damper side torque gear 32 and the far side torque gear 36 to the output gear 20. The second way is through the torque shaft 26, for example if the damper side torque gear 32 and the far side torque gear 36 were not allowed to rotate about their axis and the torque shaft 26 was free to rotate 360 degrees about the pivot bearing 38.

The load cell 30 may be any conventional load cell that can measure pressure applied thereto. The load cell 30 may be replaced with a spring loaded gauge or a force indicator. The load cell could also be replaced with an activation lever that moves a distance in relation to the force that is acting on it.

It should be understood, of course, that the foregoing relates to exemplary embodiments of the invention and that modifications may be made without departing from the spirit and scope of the invention as set forth in the following claims.

What is claimed is:

1. A torque sensor comprising:
an input shaft adapted to receive rotational force from a mechanical system;
an input shaft gear attached to the input shaft;
an output shaft;
an output shaft gear attached to the output shaft;
a torque gear adapted to be turned by the input shaft gear, the torque gear adapted to turn the output shaft gear;
a pivot joint;
a torque shaft pivotally attached to the pivot joint;
a first end of the torque shaft connected to the torque gear through a torque gear bearing; and
a second end of the torque shaft positioned to apply pressure to a load cell, wherein
torque in the mechanical system causes the torque gear and, consequently, the torque shaft, to pivot about the pivot joint, causing the second end of the torque shaft to apply pressure to the load cell in proportion to the torque in the mechanical system.

2. The torque sensor of claim 1, further comprising a second torque gear, the second torque gear positioned opposite the torque gear, wherein the torque shaft passes through the second torque gear through a second torque gear bearing.

3. The torque sensor of claim 1, further comprising an upper/lower torque bar limiter adapted to limit a degree of pivot of the torque shaft.

4. The torque sensor of claim 1, further comprising a damper adapted to dampen the motion of the torque shaft.

5. The torque sensor of claim 4, further comprising one or more damper pivot joints adapted to permit the damper to pivot relative to the torque shaft pivot.

6. The torque sensor of claim 1, wherein the input gear, the output gear and the torque gear are bevel gears.

7. The torque sensor comprising:
   an input shaft adapted to receive rotational force from a mechanical system;
   an output shaft adapted to rotate with rotation of the input shaft;
   a torque shaft connected to the input shaft via one or more gears;
   an upper/lower torque bar limiter for limiting an amount of motion of the torque shaft; and
   a load cell adapted to measure force applied thereto by the torque shaft, wherein
   rotation of the input shaft causes the torque shaft to pivot and apply a force against the load cell relative to the torque in the mechanical system.

8. A torque sensor comprising:
   an input shaft adapted to receive rotational force from a mechanical system;
   an input shaft bevel gear attached to the input shaft;
   an output shaft bevel gear attached to the output shaft;
   a first torque bevel gear adapted to be turned by the input shaft gear, the torque gear adapted to turn the output shaft gear;
   a pivot joint;
   a torque shaft pivotally attached to the pivot joint;
   a first end of the torque shaft connected to the torque gear through a torque gear bearing;
   a second end of the torque shaft positioned to apply pressure to a load cell;
   a second torque gear, the second torque gear positioned opposite the torque gear, wherein the torque shaft passes through the second torque gear through a second torque gear bearing; and
   an upper/lower torque bar limiter adapted to limit a degree of pivot of the torque shaft, wherein
   torque in the mechanical system causes the torque gear and, consequently, the torque shaft, to pivot about the pivot joint, causing the second end of the torque shaft to apply pressure to the load cell in proportion to the torque in the mechanical system.

9. The torque sensor of claim 8, further comprising a damper adapted to dampen the motion of the torque shaft.

10. The torque sensor of claim 9, further comprising one or more damper pivot joints adapted to permit the damper to pivot relative to the torque shaft pivot.

\* \* \* \* \*